(12) United States Patent
Schiffmiller et al.

(10) Patent No.: US 9,209,442 B1
(45) Date of Patent: Dec. 8, 2015

(54) PRODUCT DISPENSER

(71) Applicant: AKOIO, LLC, New York, NY (US)

(72) Inventors: Wiliam Schiffmiller, New York, NY (US); Clay Burns, New York, NY (US); Mario Quintana Serrahima, New York, NY (US); Boris Kontorovich, Brooklyn, NY (US)

(73) Assignee: Akoio, LLC, New York, NY (US)

( * ) Notice: Subject to any disclaimer, the term of this patent is extended or adjusted under 35 U.S.C. 154(b) by 40 days.

(21) Appl. No.: 14/299,009

(22) Filed: Jun. 9, 2014

(51) Int. Cl.
*B65D 83/04* (2006.01)
*H01M 2/10* (2006.01)

(52) U.S. Cl.
CPC ......... *H01M 2/1038* (2013.01); *B65D 2585/88* (2013.01)

(58) Field of Classification Search
CPC ....................................................... B65D 83/04
USPC ............ 221/73, 79, 72, 81, 82, 86, 87, 88, 89
See application file for complete search history.

(56) References Cited

U.S. PATENT DOCUMENTS

| | | | | |
|---|---|---|---|---|
| 3,279,651 A * | 10/1966 | Thompson | ......... | B65D 83/0463 206/531 |
| 3,633,792 A | 1/1972 | Steigerwald | | |
| 4,869,393 A * | 9/1989 | Soth | ..................... | H05K 13/003 156/715 |
| 5,199,565 A | 4/1993 | Voroba | | |
| 5,332,096 A * | 7/1994 | Battaglia | ............ | B65D 83/0463 206/528 |
| 5,454,900 A * | 10/1995 | Han | ..................... | B29C 63/0013 156/701 |
| 5,725,708 A * | 3/1998 | Earle | ..................... | G03D 15/043 156/157 |
| 6,082,428 A * | 7/2000 | Ando | .................... | H05K 13/021 156/701 |
| 6,164,490 A | 12/2000 | Bishop | | |
| 6,321,817 B1 * | 11/2001 | Kubota | ................ | H05K 13/021 156/701 |
| 6,581,799 B1 | 6/2003 | Garrant | | |
| 6,769,567 B2 | 8/2004 | Gauthier | | |
| 7,232,041 B2 * | 6/2007 | Ferguson | ............ | H01M 2/1038 221/113 |
| 7,461,760 B2 * | 12/2008 | Ferguson | ............ | H01M 2/1038 221/113 |
| 7,713,376 B2 * | 5/2010 | Larsson | ............... | H05K 13/021 156/65 |
| 2002/0030062 A1 * | 3/2002 | Garrant | ............. | B65D 83/0409 221/87 |
| 2004/0129717 A1 | 7/2004 | Gauthier et al. | | |
| 2006/0118572 A1 | 6/2006 | Ferguson et al. | | |
| 2009/0020549 A1 | 1/2009 | Lyndegaard et al. | | |
| 2012/0183164 A1 | 7/2012 | Foo | | |
| 2013/0015197 A1 | 1/2013 | Gauthier | | |

* cited by examiner

*Primary Examiner* — Patrick Mackey
(74) *Attorney, Agent, or Firm* — Kirschstein, Israel, Schiffmiller & Pieroni, P.C.

(57) ABSTRACT

Adhesive tabs having individual apertures are adhered to individual miniature products to be dispensed. The products are supported on a product carrier component having passages through which the tabs individually pass. A hook component is movable relative to the product carrier component. The hook component has a hook sized to successively enter each aperture, and to successively catch and successively remove each tab from its individual product during relative movement of the components.

17 Claims, 5 Drawing Sheets

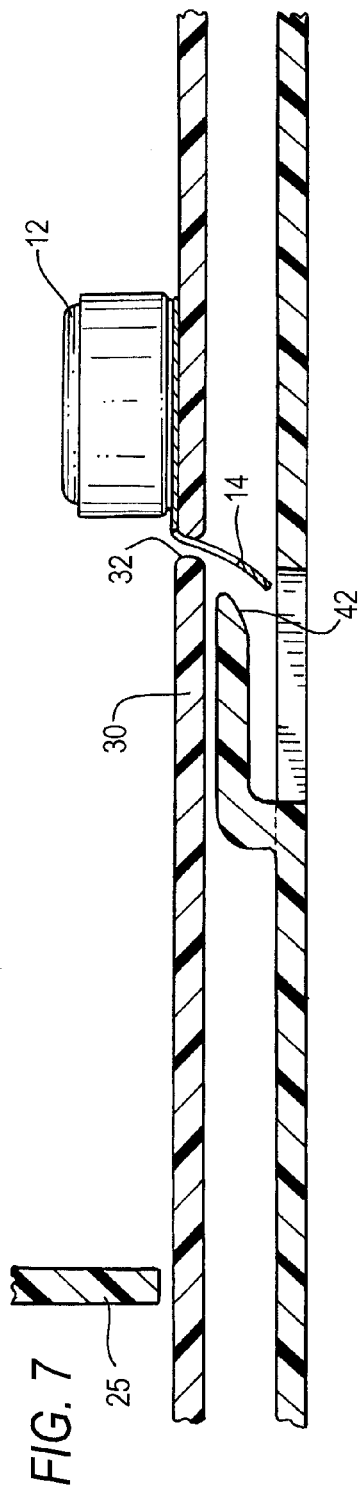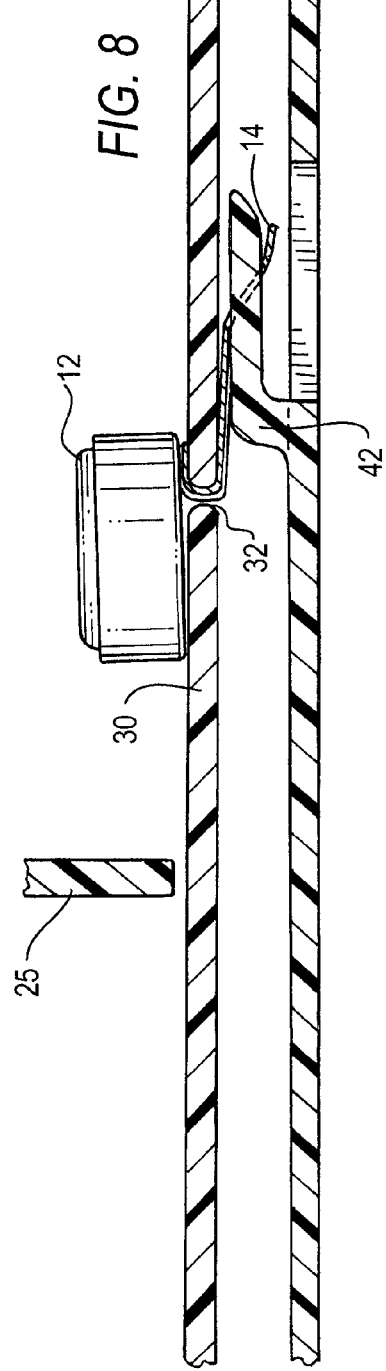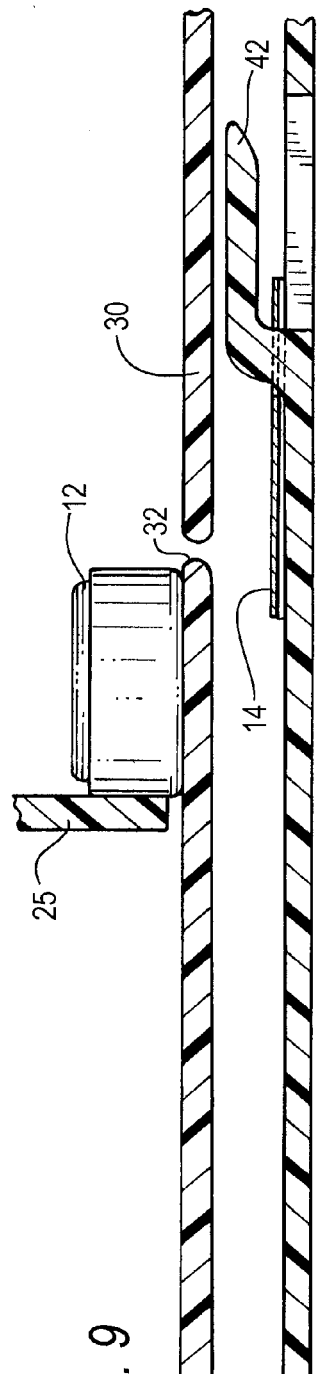

PRODUCT DISPENSER

BACKGROUND OF THE INVENTION

The present disclosure relates generally to a product dispenser and, more particularly, to a dispenser for dispensing small products including, but not limited to, miniature batteries such as hearing aid batteries, pharmaceuticals such as pills, foodstuffs such as candy, hardware such as screws, and like products that are difficult to handle primarily due to their small size.

Manual physical handling of small products can be difficult for users of all ages due to the small size of the products. In the case of hearing aids that are powered by replaceable miniature batteries, also known as button cells each having a diameter on the order of one-quarter of an inch, these miniature batteries are typically physically handled by individual users by first removing the batteries from their packaging, and then by inserting the batteries in a proper orientation into their hearing aids, each time the batteries need replacement. Mercury batteries have been used in the past, but zinc-air batteries are now more commonly used for powering hearing aids because of their higher energy density and their lower cost of manufacture. Such zinc-air batteries oxidize zinc with oxygen from the air and, hence, such batteries have air ports or vents that are typically covered, for example, by individual adhesive tabs, prior to their use in hearing aids to prevent ingress of oxygen. These tabs need to be physically removed to allow oxygen ingress when the batteries are activated and put into service, and manual removal of the tabs is an additional manual step that needs to be physically performed, thereby further complicating user handling. The handling problem is even further exacerbated if the users, as is often the case, are elderly and suffer from reduced dexterity, poor vision, or some other physical infirmity.

It is known to package zinc-air batteries in blister packs, each consisting of a thermoformed or molded plastic blister attached to a paperboard card. The blister typically comprises multiple compartments each containing an individually tabbed battery. Yet, these packs are generally difficult to open and, in any event, the user must still physically handle the battery in order to manually remove the tab, properly orient the battery, and insert the battery into the hearing aid. It is also known to package zinc-air batteries in dispensers by mounting all the batteries on a common adhesive cover strip, rather than using individual tabs to cover the air port of each battery. During dispensing, the common cover strip is pulled off each battery, one strip section at a time. Yet, the common cover strip typically has to be periodically trimmed in length, and, in some cases, the common cover strip can cause the dispenser to jam by becoming trapped and caught between moving parts of the dispenser.

Accordingly, there is a need for easing the physical burden involved in handling small products, especially miniature batteries for use in hearing aids.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 is a sectional view at a first stage prior to removing a tab from its battery in the product dispenser of FIG. 1.

FIG. 8 is a sectional view at a second stage during removal of the tab from its battery in the product dispenser of FIG. 1.

FIG. 9 is a sectional view at a third stage after removal of the tab from its battery in the product dispenser of FIG. 1.

Figure 1:
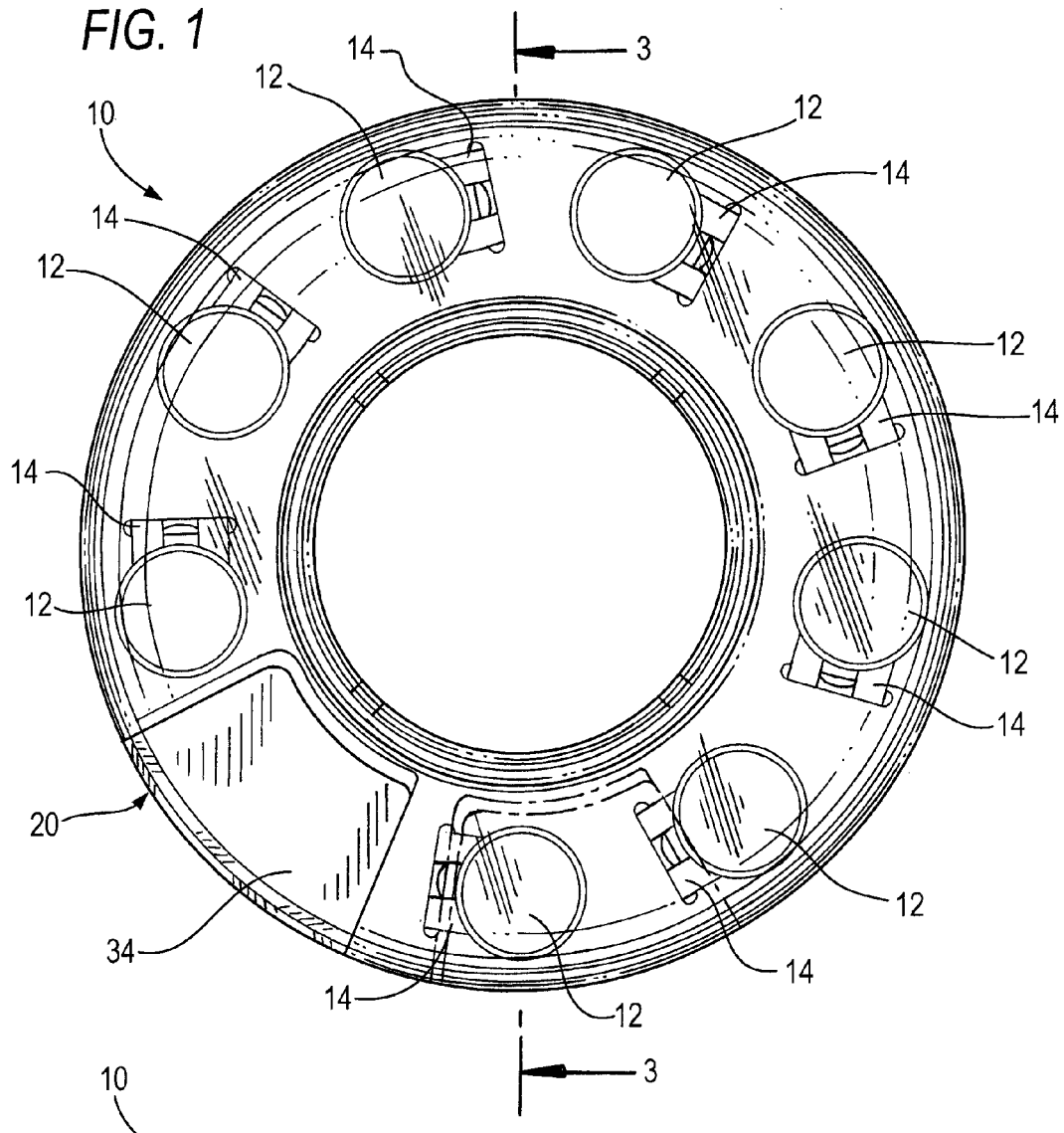
FIG. 1 is a top plan view of a product dispenser in accordance with this invention.
Figure 2:
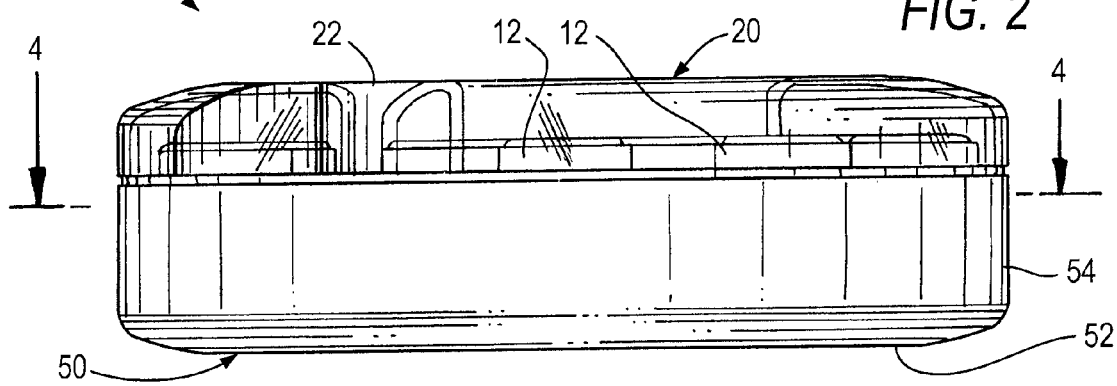
FIG. 2 is a side sectional view of the product dispenser of FIG. 1.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The components of the product dispenser have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One aspect of the present disclosure relates to a dispenser for sequentially dispensing a plurality of miniature products including, but not limited to, miniature batteries such as hearing aid batteries, pharmaceuticals such as pills, foodstuffs such as candy, hardware such as screws, and like products that are difficult to handle primarily due to their small size. The dispenser includes a plurality of adhesive tabs having individual apertures, each tab being removably adhered to an individual product, and a product carrier component for supporting a plurality of the products successively spaced apart at one side of the product carrier component. The product carrier component has a plurality of passages through which the tabs individually pass to situate the apertures at an opposite side of the product carrier component. The dispenser further includes a hook component having a hook. The hook component and the product carrier component are movable relative to each other. The hook is sized to successively enter each aperture, and to successively catch and successively remove each tab from its individual product during relative movement of the components. Thus, tab removal is performed automatically, and the handling burden on the user is eased since the user need no longer physically remove each tab.

Turning now to the drawings, reference numeral 10 in the figures generally identifies a dispenser for sequentially dispensing a plurality of miniature products 12. As illustrated, the products 12 are miniature batteries, also known as button cells each having a diameter on the order of one-quarter of an inch, and, more particularly, zinc-air batteries having air ports or vents for use in hearing aids. Even though zinc-air batteries have been illustrated, it will be understood that the present invention is not intended to be limited to such batteries, but that other miniature products 12, for example, pharmaceuticals such as pills, foodstuffs such as candy, hardware such as screws, and like products that are difficult to handle primarily due to their small size, are contemplated for dispensing by the disclosed dispenser and are thus expressly intended to be within the scope of this disclosure.

Figure 5:
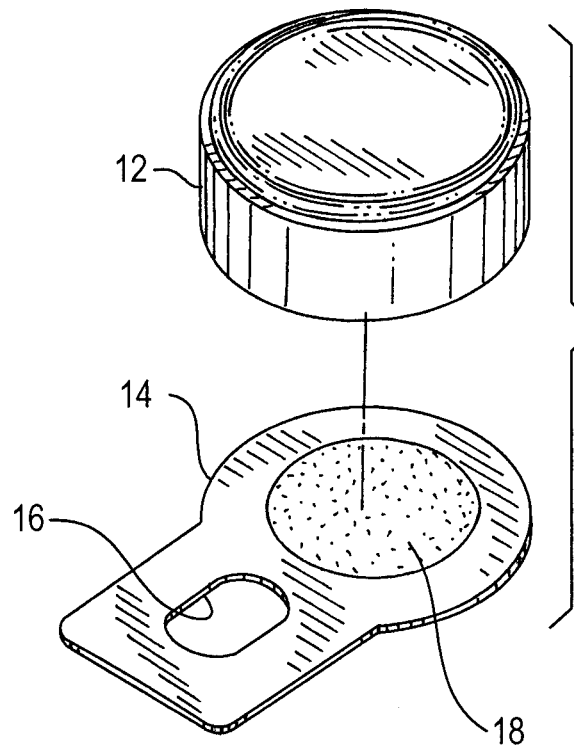
FIG. 5 is an enlarged perspective view depicting a battery and its tab for use in the product dispenser of FIG. 1.

A plurality of adhesive tabs 14 are removably adhered to the batteries 12. As best shown in FIG. 5, each tab 14 is constituted of a flexible sheet material, such as plastic film or paper, and has an individual aperture 16, preferably elongated. An adhesive layer 18 is provided on an upper surface of each tab 14 and is operative for adhesively attaching the tab 14 to an individual battery 12. The adhesive layer 18 is not a permanent aggressive adhesive, and therefore, permits the tab 14 to be peeled and removed from the battery 12. Another adhesive layer (not visible in FIG. 5) is provided on a lower surface of each tab 14, as described below. In a preferred embodiment, the batteries 12 are zinc-air batteries having air ports or vents on their sides facing the tabs 14. As described above, the tabs 14 cover these ports to prevent ingress of oxygen prior to activation and use.

Figure 6:
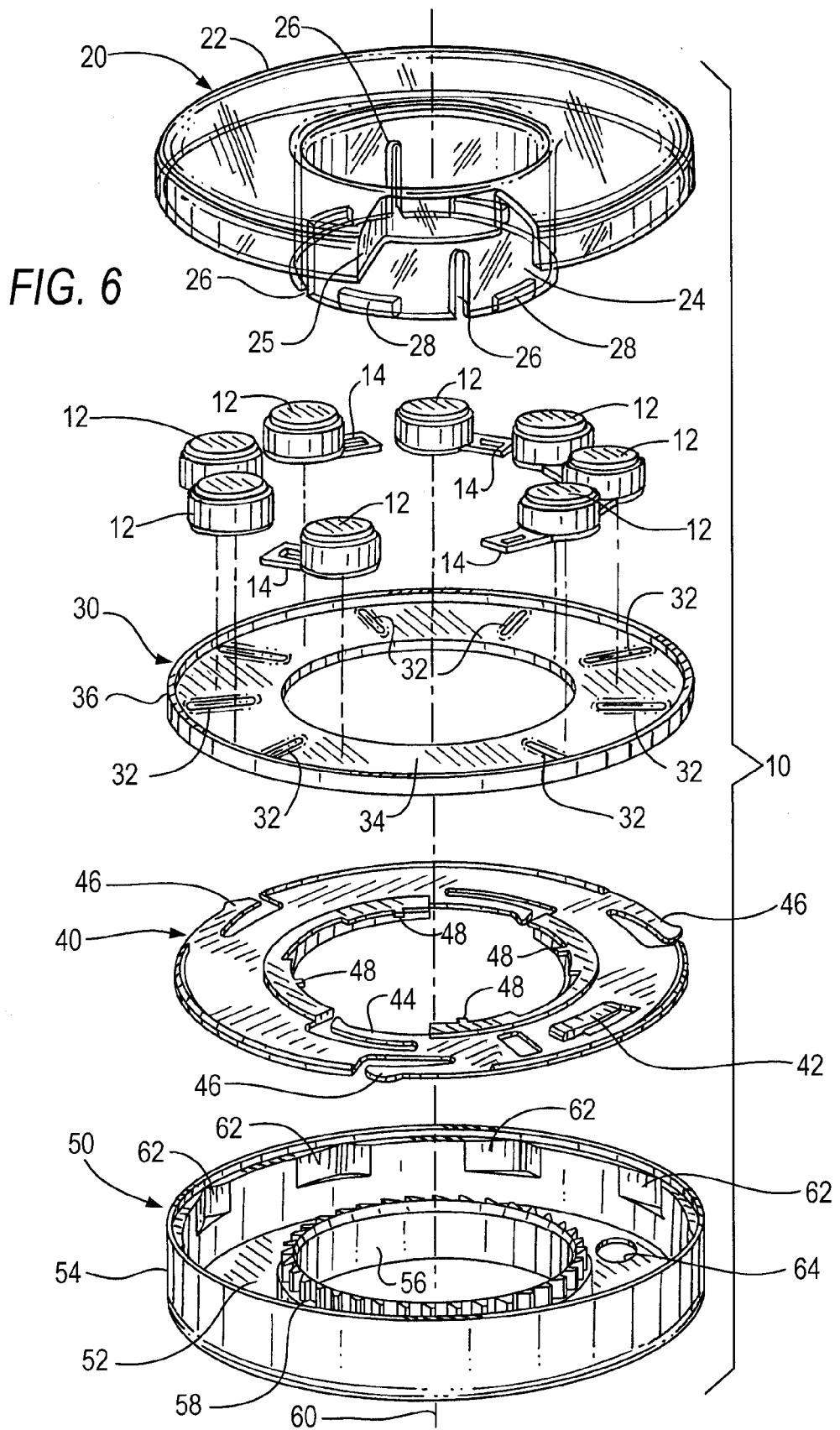
FIG. 6 is an exploded view of the product dispenser of FIG. 1.

Turning now to FIG. 6, the dispenser 10 includes a cover component 20, a product carrier component 30, a hook component 40, and a base component 50, as considered along a longitudinal axis 60. In one preferred embodiment, the product carrier component 30 is a generally flat, thin, circular ring, preferably constituted of a rigid material, such as plastic, which supports a plurality of the batteries 12 that are successively spaced circumferentially apart at an upper side of the product carrier component 30. The product carrier component 30 has a plurality of slits or passages 32 through which the tabs 14 individually pass to situate the apertures 16 at an opposite lower side of the product carrier component 30 (see FIG. 7). The passages 32 extend radially of the axis 60 and are spaced circumferentially apart, one radial passage for each tab 14 and its associated battery 12. No passage 32 is located in a dispensing area 34 (see FIG. 1).

Figure 4:
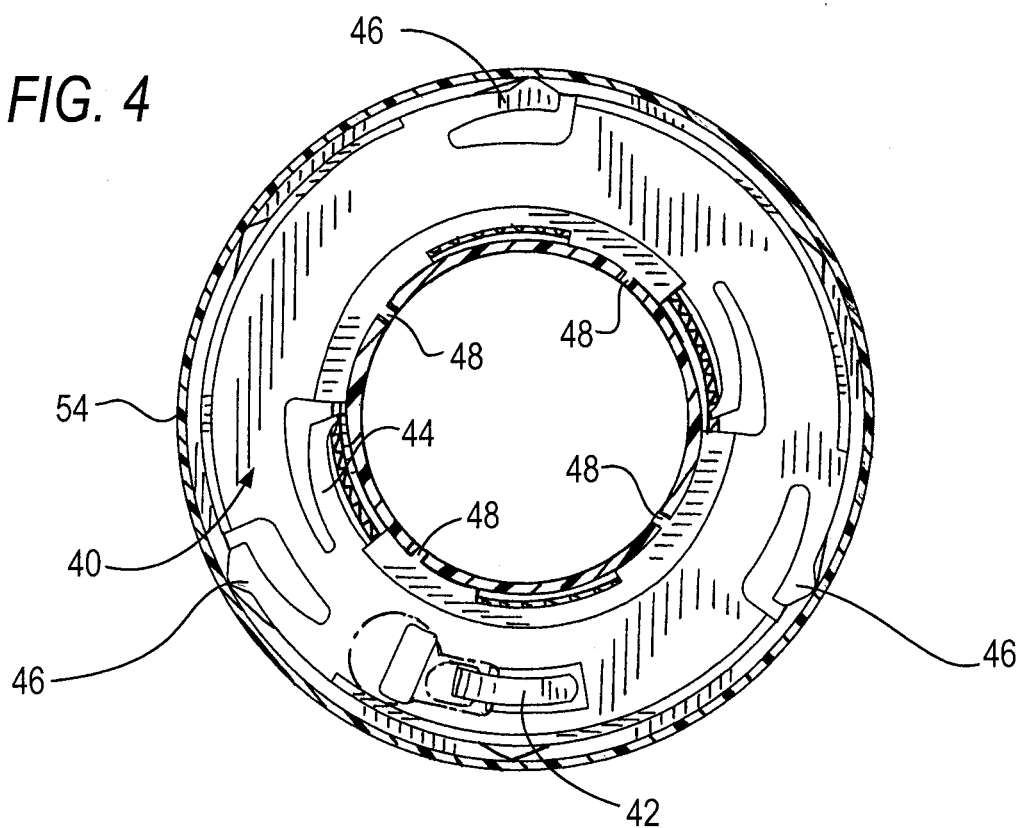
FIG. 4 is a sectional view taken in the direction of the arrows on the line 4-4 of FIG. 2.

The hook component 40 (shown in isolation in FIG. 4) is a generally flat, thin, circular ring, preferably constituted of a rigid material, such as plastic, which has a hook 42, a resilient inner finger 44 at an inner circumferential surface, and a plurality of resilient outer fingers 46 equiangularly arranged at an outer circumferential surface of the hook component 40. The hook component 40 also has a plurality of radial pins 48 equiangularly arranged at its inner circumferential surface.

The base component 50 is of molded plastic construction and has a generally planar, circular bottom wall 52 and an upright circular base wall 54. The bottom wall 52 has an upright cylindrical collar 56 whose upper end has serrations or teeth 58 arranged in an annulus for engagement with the inner finger 44, as described below. The base wall 54 has a plurality of equiangularly spaced-apart detents 62 for snap-type engagement with the outer fingers 46, as described below. The base wall 54 also has an inlet hole 64 in communication with an annular storage compartment 66 that surrounds the collar 56.

The cover component 20 is of molded plastic construction and has a light-transmissive, circular top wall 22 through which the batteries 12 are visible, and a cylindrical neck 24 having a plurality of equiangularly spaced-apart notches 26 for engagement with the radial pins 48, as described below. An upright wall 25 extends away from the top wall 22. A plurality of equiangularly spaced-apart projections 28 are exteriorly arranged around the neck 24.

The dispenser 10 is assembled as follows. The hook component 40 is mounted with snap-type action in the base component 50 by receiving the outer fingers 46 into one set of detents 62. Concomitantly, the inner finger 44 engages one of the teeth 58. Next, the batteries 12 with their attached tabs 14 are mounted on the product carrier component 30, with each tab 14 being inserted into a respective radial passage 32 so that each aperture 16 is located underneath the product carrier component 30. As mentioned above, the underside of each tab 14 has an adhesive layer to adhere the tab 14 and its battery 12 to the product carrier component 30. In one variation, each tab 14 can be inserted into its passage 32 first, followed by mounting the battery 12 on top of the tab 14. In another variation, each tab 14 is adhered to its battery 12 first, followed by adhering the tab to the product carrier component 30.

The product carrier component 30 is then placed an top of the hook component 40. Then, the product carrier component 30 is fixed to the base component 50. This is preferably performed by ultrasonically welding a circular rim flange 36 of the product carrier component 30 to the interior circumferential surface of the upright base wall 54 of the base component 50. The aforementioned mounting of the batteries 12 and their tabs 14 could be performed prior to the welding step as described above, or could be performed after the welding step.

Next, the cover component 20 is mounted with snap-type action by axially lowering the neck 24 so that the notches 26 receive and lockingly engage the radial pins 48 until the projections 28 resiliently engage the inner circumferential surface of the collar 56.

After assembly, the cover component 20 and the hook component 40 are jointly rotatable as a movable unit about the axis 60 because they are locked together by the engagement of the radial pins 48 and the notches 26. The product carrier component 30 and the base component 50 do not participate in this movement because they are welded together as a stationary unit. During the rotation of the movable unit, the inner finger 44 is moved past the teeth 58, thereby making a characteristic clicking sound to audibly signal a user that the movable unit is indeed rotating. In addition, during the rotation of the movable unit, the outer fingers 46 are moved from a first position in which they engage with a snap-type action into one set of the detents 62, to another angularly offset position in which they again engage with a snap-type action into another set of the detents 62.

In use as a dispenser, the hook component 40 and the product carrier component 30 are movable relative to each other. As best shown in FIGS. 7-9, the hook 42, whose leading end is preferably pointed, enters each aperture 16, and catches and removes each tab 14 from its individual battery 12 during such relative movement of the components. This process is repeated for each battery in succession. Each battery 12, now with its tab 14 removed, is presented to the dispensing area 34 for further handling. Thus, tab removal is performed automatically, and the handling burden on the user is eased since the user need no longer physically remove each tab 14.

Figure 3:
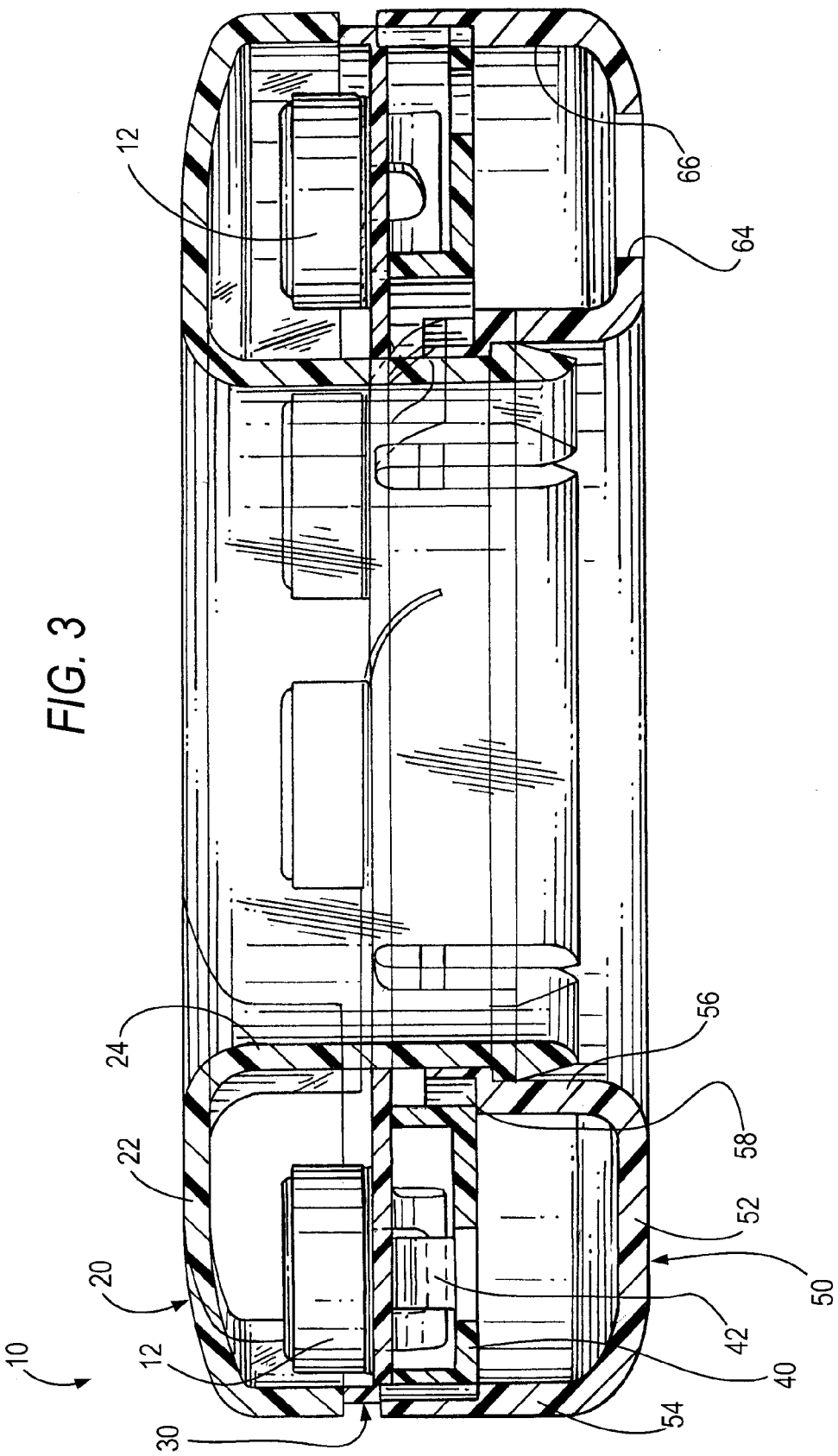
FIG. 3 is an enlarged sectional view taken in the direction of the arrows on the line 3-3 of FIG. 1.

Spent batteries can be conveniently stored in the dispenser 10. The spent batteries are inserted into the inlet hole 64 (see FIG. 3) and stored in the internal storage compartment 66.

In the foregoing specification, specific embodiments have been described. However, one of ordinary skill in the art appreciates that various modifications and changes can be made without departing from the scope of the invention as set forth in the claims below. For example, the various components need not be circular and rotatable about the axis 60, but could be linearly shaped, in which case, the dispensing would be performed along a linear track. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A dispenser for sequentially dispensing a plurality of miniature products, comprising:
   a plurality of adhesive tabs having individual apertures, each tab being removably adhered to an individual product;
   a product carrier component for supporting a plurality of the products successively spaced apart at one side of the product carrier component, the product carrier component having a plurality of passages through which the tabs individually pass to situate the apertures at an opposite side of the product carrier component; and
   a hook component having a hook, the hook component and the product carrier component being movable relative to each other, the hook being sized to successively enter each aperture, and to successively catch and successively remove each tab from its individual product during relative movement of the components.

2. The dispenser of claim 1, wherein each adhesive tab is constituted of a flexible sheet material, and wherein each tab is adhesively attached to an individual product, and is also adhesively attached to the product carrier component.

3. The dispenser of claim 1, wherein the components are annular and are rotatable relative to each other about an axis.

4. The dispenser of claim 3, wherein the product carrier component is a circular disk, and wherein the passages are radial slits extending radially of the axis.

5. The dispenser of claim 4, wherein the hook component is a circular disk axially spaced at a spacing away from the product carrier component, and wherein the hook is situated in the spacing.

6. The dispenser of claim 1, and further comprising a base component connected to the product carrier component as a stationary assembly, and a cover component connected to the hook component as a movable assembly, and wherein the movable assembly is rotatable about an axis relative to the stationary assembly.

7. The dispenser of claim 1, and further comprising a base component connected to the product carrier component and having an interior storage compartment for holding the products after their use.

8. The dispenser of claim 1, and further comprising a cover component connected to the hook component and overlying the product carrier component, and wherein the cover component is constituted of a light-transmissive material to enable viewing of the products.

9. The dispenser of claim 1, wherein the products are batteries having air vents, and wherein the tabs cover the air vents prior to dispensing.

10. A dispenser for sequentially dispensing a plurality of miniature batteries, comprising:
    a plurality of adhesive tabs having individual apertures, each tab being removably adhered to an individual battery;
    a battery carrier component for supporting a plurality of the batteries successively spaced apart at one side of the battery carrier component, the battery carrier component having a plurality of passages through which the tabs individually pass to situate the apertures at an opposite side of the battery carrier component; and
    a hook component having a hook, the hook component and the battery carrier component being rotatable relative to each other about an axis, the hook being sized to successively enter each aperture, and to successively catch and successively remove each tab from its individual battery during relative movement of the components.

11. The dispenser of claim 10, wherein each adhesive tab is constituted of a flexible sheet material, and wherein each tab is adhesively attached to an individual battery, and is also adhesively attached to the battery carrier component.

12. The dispenser of claim 10, wherein the battery carrier component is a circular disk, and wherein the passages are radial slits extending radially of the axis.

13. The dispenser of claim 12, wherein the hook component is a circular disk axially spaced at a spacing away from the battery carrier component, and wherein the hook is situated in the spacing.

14. The dispenser of claim 10, and further comprising a base component connected to the battery carrier component as a stationary assembly, and a cover component connected to the hook component as a movable assembly, and wherein the movable assembly is rotatable about the axis relative to the stationary assembly.

15. The dispenser of claim 10, and further comprising a base component connected to the battery carrier component and having an interior storage compartment for holding the batteries after their use.

16. The dispenser of claim 10, and further comprising a cover component connected to the hook component and overlying the battery carrier component, and wherein the cover component is constituted of a light-transmissive material to enable viewing of the batteries.

17. The dispenser of claim 10, wherein the batteries having air vents, and wherein the tabs cover the air vents prior to dispensing.

* * * * *